(12) United States Patent
Fawcett

(10) Patent No.: US 11,343,163 B1
(45) Date of Patent: *May 24, 2022

(54) SYSTEM AND METHOD FOR IMPROVING QUALITY OF TELEMATICS DATA

(71) Applicant: Nationwide Mutual Insurance Company, Columbus, OH (US)

(72) Inventor: David E. Fawcett, Hilliard, OH (US)

(73) Assignee: Nationwide Mutual Insurance Company, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/921,442

(22) Filed: Jul. 6, 2020

Related U.S. Application Data

(63) Continuation of application No. 15/858,167, filed on Dec. 29, 2017, now Pat. No. 10,742,528.

(51) Int. Cl.
| | |
|---|---|
| *B60W 40/09* | (2012.01) |
| *H04L 43/04* | (2022.01) |
| *G08G 1/01* | (2006.01) |
| *H04L 43/106* | (2022.01) |
| *G08G 1/123* | (2006.01) |

(52) U.S. Cl.
CPC ............ *H04L 43/04* (2013.01); *B60W 40/09* (2013.01); *G08G 1/0104* (2013.01); *G08G 1/0112* (2013.01); *G08G 1/123* (2013.01); *H04L 43/106* (2013.01)

(58) Field of Classification Search
CPC .. G01C 21/32; G01C 21/3617; G05B 13/041; G05D 1/0088; G08G 1/052; G08G 1/0104; G08G 1/127; G08G 1/123; B60W 40/09; H04L 43/04; H04L 43/106
USPC ......... 370/230, 252, 338; 348/149; 701/119, 701/466

See application file for complete search history.

(56) References Cited

U.S. PATENT DOCUMENTS

| | | | |
|---|---|---|---|
| 8,189,048 B2* | 5/2012 | Smith ................... | G08G 1/052 348/149 |
| 2010/0286899 A1 | 11/2010 | Jain et al. | |
| 2012/0290198 A1 | 11/2012 | Firl et al. | |
| 2016/0265930 A1* | 9/2016 | Thakur ................. | G05D 1/0088 |
| 2018/0374111 A1* | 12/2018 | Corry ................... | B60W 40/09 |

* cited by examiner

*Primary Examiner* — Harun Chowdhury
(74) *Attorney, Agent, or Firm* — Morgan, Lewis & Bockius LLP

(57) ABSTRACT

Each of multiple vehicle data collection devices are configured to collect data streams associated with operation of a vehicle. The data streams include time-stamped speed data. A transmitter is configured to transmit the data streams. An analytics server is configured to receive the data streams transmitted by the transmitter and to process the data. In connection with the processing, data streams with at least one common time stamp are identified. The time-stamped speed for one of the data streams at a first time interval is compared to the time-stamped speed for another of the identified plurality of data streams at a second time interval, where the second time interval comprises the first time interval plus an additional time increment. Based on the comparison, it is determined whether the two of the plurality of data streams are associated with a same trip or a different trip.

9 Claims, 3 Drawing Sheets

SYSTEM AND METHOD FOR IMPROVING QUALITY OF TELEMATICS DATA

CROSS REFERENCE TO RELATED APPLICATIONS

This application is a continuation of U.S. patent application Ser. No. 15/858,167 filed Dec. 29, 2017, entitled "System and Method for Improving Quality of Telematics Data," which is incorporated by reference herein in its entirety.

FIELD OF THE INVENTION

The invention relates to methods and systems for improving the quality of telematics data originating from motor vehicle systems.

BRIEF SUMMARY OF EMBODIMENTS OF THE INVENTION

Embodiments of the invention are further directed to a vehicle data collection and analysis system. Each of multiple vehicle data collection devices are configured to collect data streams associated with operation of a vehicle. The data streams include time-stamped speed data. A transmitter is configured to transmit the data streams. An analytics server is configured to receive the data streams transmitted by the transmitter and to process the data. In connection with the processing, distinct data streams with at least one common time stamp are identified. The time-stamped speed for one of the data streams at a first time interval is compared to the time-stamped speed for another of the identified plurality of data streams at a second time interval, where the second time interval comprises the first time interval plus an additional time increment. Based on the comparison, it is determined whether the two of the plurality of data streams are associated with a same trip or a different trip.

BRIEF DESCRIPTION OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings.

DETAILED DESCRIPTION OF THE EXEMPLARY EMBODIMENTS

Figure 1A:
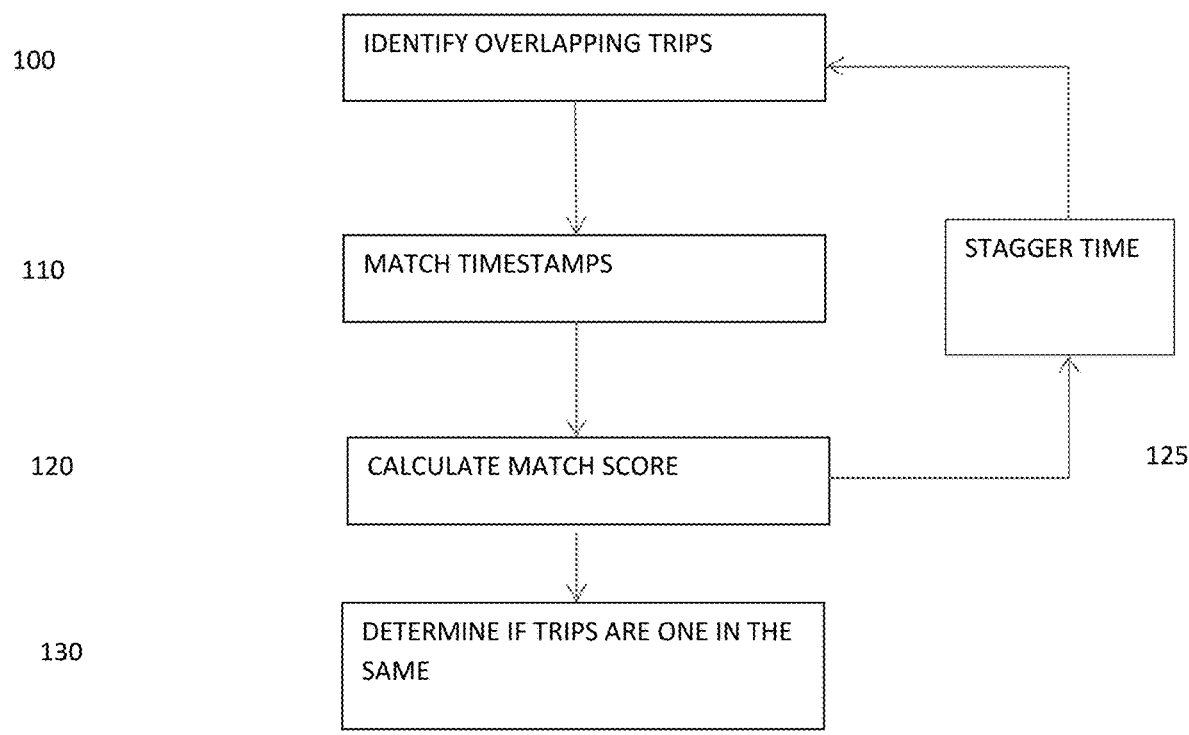
FIG. 1A illustrates an exemplary method of the present invention.

The present invention relates to a telematics system and method that involves using one or more devices to collect data associated with the operation of one or more motor vehicles. Such data may be analyzed by an insurance company and used in connection with determining insurance rates and associated premiums. As described more fully herein, such data may be collected by way of multiple devices. While such devices and data collection techniques are conventional, their use presents a technical problem. More particularly, a technical problem arises in connection with use of this telematics data when the insurance company receives multiple data streams, from multiple different devices, and needs to make a determination as to which of the data is associated with a same trip (i.e., collected using two different devices) and which of the data is associated with different trips. Only one set of data associated with each trip is to be considered in connection with determining insurance rates and associated premiums. The present invention solves this problem by providing a method of determining whether the data collected by multiple different devices is associated with the same trip, or different trips. In this way, the technical problem is solved by improving the quality of the data available to the insurance company.

The techniques described herein can also be used to determine whether two vehicles are making the same trip.

Generally, the present invention involves comparing, at each second of an identified trip, the speed associated with data from two collection streams. An algorithm is then applied and the result is considered. The smaller the numerical value of the result, the more likely it is that the two data streams under analysis are associated with the same trip. In some embodiments, the analysis is expanded to account for time stamps being out-of-synch due to clocks in the devices not being synchronized. In such embodiments, the algorithm is re-run several times against the time stamped data, where the time on one of the data streams is staggered each time it is run. Thus, for example, a data stream on device 1 is shifted ahead by one second (and then 2 seconds, and then 3 seconds etc. up to some extended period, e.g., 5 minutes), and compared to a data stream for device 2. In certain embodiments, the process is repeated with the data stream switched—i.e., the data stream on device 2 is shifted ahead by one second (and then 2 seconds, and then 3 seconds etc. up to some extended period, and compared to a data stream for device 1). This results in a series of scores, which are reviewed to identify the minimum scores across the collection of scores, thus indicating matching trips based on a predetermined threshold. The analysis can be performed on trip segments. This is useful because some devices do not collect data continuously and, instead, report multiple segments of data streams for a single trip.

The device used to collect the data to be analyzed may comprise one or more mechanical objects. Such device may be any device that is capable of receiving and transmitting data in accordance with the methodology described herein and collecting speed and associated time stamps. For example, the device may be a device that connects to and receives data from (wirelessly or wired) the on-board diagnostics system of a vehicle, or may be a mobile phone that either collects data from the on-board diagnostics system of a vehicle or has the capability to sense/collect vehicle data itself. By way of specific example, the device may be an OBD-II plug-in device that pulls position timestamp and speed data. The device may also be a smart phone application that pulls either GPS latitude and longitude or GPS speed and the position timestamp. The device may also be a connected car that provides speed and position timestamp. Thus, for example, a non-exhaustive list of devices includes: a device plugged into a vehicle's OBD-II port, a connected vehicle, a Smartphone, a device placed in a vehicle but not directly connected to the vehicle's data bus, or any combination of two or more devices. All collection methods are within the scope of the present invention, so long as speed and time stamps are collected. The device transmits the data that it collects, e.g., wirelessly, over a computer network or using cellular telephone communications.

The data may be collected by a variety of different collection methods. For instance, an OBD-II device can collect data by reading specific data elements coming from the vehicle's data bus (e.g., vehicle speed), while a smart phone would make use of GPS satellites to derive driving speed data. Other known collection methods are within the scope of the present invention.

As noted above, time stamped speed data is collected and used in connection with the present invention. Speed data may be collected in any of a number of ways as described above. A timestamp is a specific point in time denoted by the year, month, day, hour, minute, second and fraction of a second. These are typically provided in some variation of MM/DD/YYYY HH:MM:SS.ssssss.

In some embodiments, location can be used to identify duplicate trips instead of speed. In such an embodiment, the distances recorded by two devices would be compared instead of the speed. More particularly, the distance between two points at each second can be calculated and then the average distance between every pair of points can be found. As in the previous example, the lower the number, the more likely the trips are one in the same. Thus, for example at time t1, the first data stream has recorded a GPS point of (Latitude1, Longitude1) and the second data stream has recorded a GPS point of (Latitude2, Longitude2). The distance between these two points can be calculated as distance at time t1. Similarly, the distance between the GPS points at time t1+1 can be calculated. Once all of the applicable distances have been found, an average of the distances can be derived. The lower the average distance between the data points from the two data streams, the more likely the trips are to be one-in-the-same.

The present invention involves a computer-implemented process that determines if data collected by two different device/collection methods is associated with two different trips or the same trip. The process is described with reference to FIG. 1A. In one exemplary embodiment, in a first step, the two trips that could be one-in-the-same trip are identified in step 100. In some instances, due to differences in how data is collected across platforms, a trip collected by device/method combination 1 could be a subset of a trip collected by device/method combination 2 or vice versa. Thus, in one embodiment, trips are identified by looking at all trips taken that are associated with a policy. The trip start and trip end times are considered to determine if any of the trips overlap (e.g., if any time stamp in trip 1 is between the start and end time in trip 2, it would be considered as a potential match, and vice versa). For each combination of overlapping trips, the algorithm is performed as described below. While in the exemplary embodiment the trips under consideration are those connected with a single policy, as will be understood, the same process can be undertaken for any two (or more) trips, regardless of whether the trips are associated with a same policy.

As used herein:
Speed from trip one at Timestamp i: $Speed_{Trip1(i)}$
Speed from trip two at Timestamp i: $Speed_{Trip2(i)}$
Number of observations: n For the two trips identified in step 100, the timestamps are matched, in step 110. In an exemplary embodiment, all timestamps are matched at the second level. However, it is possible to perform this analysis at sub-second level or with time intervals exceeding one second.

If two or more observations have been recorded for a trip at the same timestamp precision, the speeds are averaged to generate a speed at the given timestamp precision. That is, if the desired timestamps are to be at the second level and two distinct observations are recorded at the same time stamp, for example, speed is 70 at 10/17/2017 13:54:55.13 and speed is 74 at 10/17/2017 13:54:55.27, the speed utilized would be 72 for the timestamp 10/17/2017 13:54:55.

Any timestamp that only has speed calculations from one device/method combination will be ignored for computational purposes. This can occur for any of a number of reasons (e.g., one trip is a subset of the other trip and the timestamp is not present on both trips; the timestamp did not have a corresponding speed recorded from one device/method combination; or for one of the trips, the speed recorded at a timestamp from one or both of the trips was of questionable accuracy for some reason).

Once the trips are matched on a second-by-second basis, the following formula may be used to calculate a match score, in step 120:

$$MatchScore = \frac{\sum_{i=1}^{n}(Speed_{Trip1(i)} - Speed_{Trip2(i)})^2}{n}$$

A lower MatchScore indicates a higher degree of certainty that the trips are one-in-the-same.

Because internal clocks from two different devices may not be in sync, the foregoing steps are repeated but with the trip data streams offset by one second, in step 125, effectively changing the MatchScore formula to be:

$$MatchScore = \frac{\sum_{i=1}^{n}(Speed_{Trip1(i+1)} - Speed_{Trip2(i)})^2}{n}$$

Table 1 provides an example of this aspect of the process for a small segment of a trip.

|  | Trip 2 Time Stamp | | |
|---|---|---|---|
| Trip 1 Timestamp | Match Score 1 | Match Score 2 | Match Score 3 |
| ... | ... | ... | ... |
| 10/1/1017 16:00:00 | 10/1/1017 16:00:00 | 10/1/1017 16:00:01 | 10/1/1017 15:59:59 |
| 10/1/1017 16:00:01 | 10/1/1017 16:00:01 | 10/1/1017 16:00:02 | 10/1/1017 16:00:00 |
|  | 10/1/1017 16:00:02 | 10/1/1017 16:00:03 | 10/1/1017 16:00:01 |
| 10/1/1017 16:00:03 | 10/1/1017 16:00:03 | 10/1/1017 16:00:04 | 10/1/1017 16:00:02 |
| 10/1/1017 16:00:04 | 10/1/1017 16:00:04 | 10/1/1017 16:00:05 | 10/1/1017 16:00:03 |
| ... | ... | ... | ... |

Once this foregoing step is completed for as many iterations as required or desired, the minimum match score from all the iterations is then selected as the match score for the two trips, in step 130. As stated previously, a lower score indicates a higher degree of certainty that the two trips are one-in-the-same.

Figure 1B:
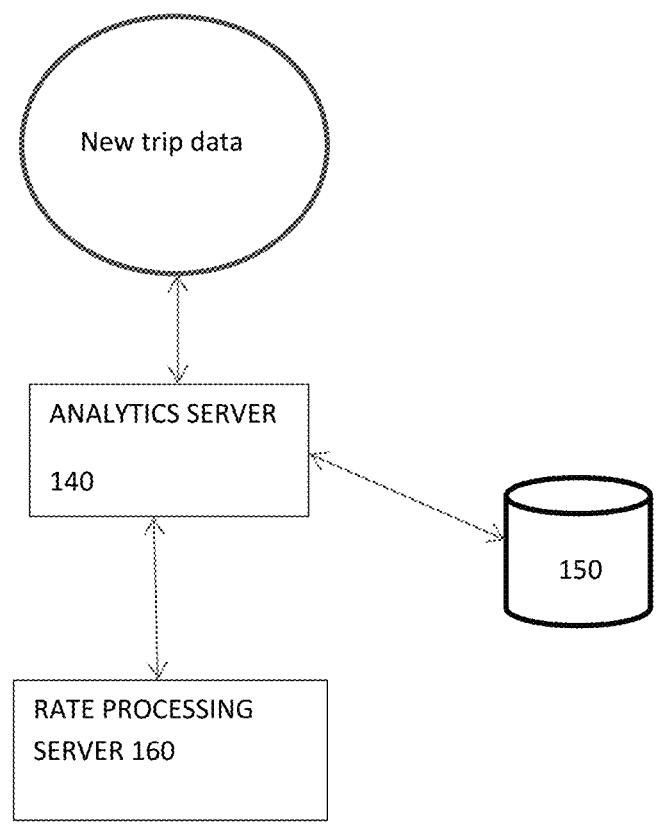
FIG. 1B illustrates a logical diagram of exemplary computer architecture in accordance with embodiments of the present invention.

With reference to FIG. 1B, an exemplary logical computer architecture that may be used to implement embodiments of the present invention is illustrated. New trip data is received by analytics server 140 (e.g., from a data aggregator, or directly). The trip data is ingested, which involves, in an exemplary embodiment, standardization of the data and auditing. As part of ingesting the trip data, analytics server 140 processes the data to identify duplicate trips, as described herein. Once determined, the match score data is sent, along with other data, to rate processing server 160. Rate processing server 160 processes the match score data to decide which data to use in connection with determining whether discounts and/or policy adjustments are available (i.e., thereby ensuring that data that is collected from two different devices, but is really associated with the same trip, is not counted twice). Score data is stored in database 150. The consumer's policy file is updated and administration is performed on the consumer's automobile insurance policy to reflect a new rating. The consumer is presented with new policy documents, which reflect any new rate offered.

Figure 2:
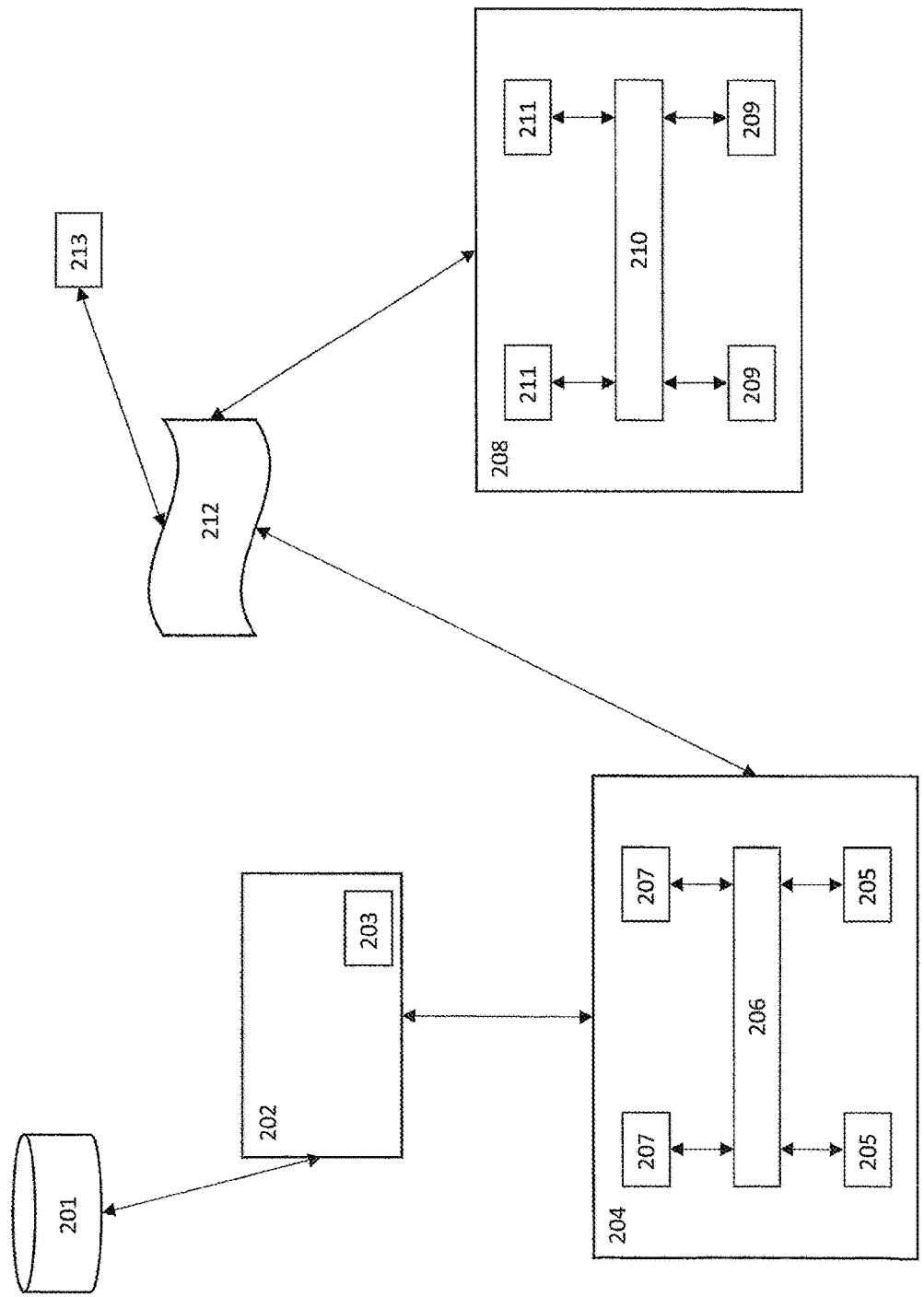
FIG. 2 illustrates an exemplary system architecture of the present invention.

In some embodiments, the methods are carried out by a system that employs a client/server architecture such as, for example, the collection of components illustrated and described with reference to FIG. 1B. Such exemplary embodiments are described as follows with reference to FIG. 2. The data that may be used as an input to the system, and the outputs from the system, may be stored in one or more databases 201. Database server(s) 202 may include a database services management application 203 that manages storage and retrieval of data from the database(s) 201. The databases 201 may be relational databases; however, other data organizational structures may be used without departing from the scope of the present invention.

One or more application server(s) 204 are in communication with the database server 202. The application server 204 communicates requests for data to the database server 202. The database server 202 retrieves the requested data. The application server 204 may also send data to the database server 202 for storage in the database(s) 201. The application server 204 comprises one or more processors 205, non-transitory computer readable storage media 207 that store programs (computer readable instructions) for execution by the processor(s), and an interface 206 between the processor(s) 205 and computer readable storage media 207. The application server 204 may store the computer programs referred to herein.

To the extent data and information is communicated over a network (e.g., the Internet or an Intranet), one or more network servers 208 may be employed. The network server 208 also comprises one or more processors 209, computer readable storage media 211 that store programs (computer readable instructions) for execution by the processor(s), and an interface 210 between the processor(s) 209 and computer readable storage media 211. The network server 208 is employed to deliver content that can be accessed through the communications network 212, e.g., by an end user employing computing device 213. When data is requested through an application, such as an Internet browser, the network server 208 receives and processes the request. The network server 208 sends the data or application requested along with user interface instructions for displaying a user interface on device 213.

The computers referenced herein are specially programmed to perform the functionality described herein.

The non-transitory computer readable storage media (e.g., 207 or 211) that store the programs (i.e., software modules comprising computer readable instructions) may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system and processed.

A computer is required to process the data gathered by the device at least because the volume of data processed by the system is extraordinarily large—e.g., hundreds of millions of seconds of driving data on a daily basis.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A vehicle data collection and evaluation system comprising:
 a plurality of vehicle data collection devices associated with a vehicle, the plurality of vehicle data collection devices configured to collect a plurality of data streams associated with the vehicle, wherein each of the plurality of data streams comprises time-stamped location data;
 a plurality of transmitters configured to transmit the plurality of data streams, wherein each of the plurality of transmitters is communicatively coupled to one of the plurality of vehicle data collection devices; and
 an analytics server configured to receive the plurality of data streams transmitted by the plurality of transmitters and to process the plurality of data streams, the processing comprising:
  (i) identifying two or more of the plurality of data streams with at least one common time stamp, the two or more of the plurality of data streams being associated with the vehicle;

(ii) comparing, at a time interval, the time-stamped location data for one of the identified data streams to the time-stamped location data for another of the identified data streams to generate a comparison value; and (iii) based on the comparison value, determining whether a set of the two or more of the identified data streams are associated with a same trip or a different trip, wherein the comparison value is compared to a predetermined threshold value to determine whether the two of the plurality of data streams are associated with the same trip.

2. The system of claim 1, wherein the plurality of vehicle data collection devices are housed in the vehicle during operation of the vehicle.

3. The system of claim 1, wherein each one of the plurality of vehicle data collection devices connects to and receives data from an on-board diagnostics system associated with the vehicle.

4. The system of claim 1, wherein the processing further comprises:

filtering out time-stamped location data that is only associated with one of the plurality of vehicle data collection devices.

5. The system of claim 1, wherein comparison value indicates whether the two of the plurality of data streams are associated with the same trip or the different trip.

6. The system of claim 1, wherein the at least one common time stamp is rounded to the nearest second.

7. The system of claim 1, wherein the time interval is a second.

8. A vehicle data collection and evaluation system comprising:

a plurality of vehicle data collection devices associated with a vehicle, the plurality of vehicle data collection devices configured to collect a plurality of data streams associated with the vehicle, wherein each of the plurality of data streams comprises time-stamped location data;

a plurality of transmitters configured to transmit the plurality of data streams, wherein each of the plurality of transmitters is communicatively coupled to one of the plurality of vehicle data collection devices; and an analytics server configured to receive the plurality of data streams transmitted by the plurality of transmitters and to process the plurality of data streams, the processing comprising:

(i) identifying two or more of the plurality of data streams with at least one common time stamp, the two of the plurality of data streams being associated with the vehicle;

(ii) comparing the time-stamped location data for one of the identified plurality of data streams at a first time interval to the time-stamped location data for another of the identified plurality of data streams at a second time interval to generate a comparison value, the second time interval comprising the first time interval plus an additional time increment; and (iii) based on the comparison value, determining whether a set of the two or more of the identified data streams are associated with a same trip or a different trip, wherein the comparison value is compared to a predetermined threshold value to determine whether the two of the plurality of data streams are associated with the same trip.

9. The system of claim 8, wherein the first time interval is a second and the additional time increment is a second.

* * * * *